United States Patent [19]

Adam et al.

[11] Patent Number: 4,887,916
[45] Date of Patent: Dec. 19, 1989

[54] CLAMPING PLATE FOR THE RETENTION OF SELF-ALIGNING FRICTION BEARING

[75] Inventors: Peter Adam, Höchberg; Ferdinand Hoffmann, Hemer; Michael Rüb, Würzburg, all of Fed. Rep. of Germany

[73] Assignee: Siemens Aktiengesellschaft, Berlin & Munich, Fed. Rep. of Germany

[21] Appl. No.: 248,548

[22] Filed: Sep. 23, 1988

[30] Foreign Application Priority Data

Sep. 25, 1987 [DE] Fed. Rep. of Germany ....... 8712959

[51] Int. Cl.⁴ .................... F16C 23/04; H02K 5/16; F16F 1/34
[52] U.S. Cl. .................... 384/192; 267/161; 310/90; 384/204; 384/210
[58] Field of Search .................... 384/192, 202–204, 384/206, 209, 210, 213, 214; 310/90; 267/161, 163

[56] References Cited

U.S. PATENT DOCUMENTS

| 3,754,802 | 8/1973 | Keller | 384/203 |
| 4,355,250 | 10/1982 | Langdon | 384/192 X |
| 4,542,852 | 9/1985 | Orth et al. | 267/161 X |
| 4,716,327 | 12/1987 | Stone | 310/90 |
| 4,806,025 | 2/1989 | Kamiyama et al. | 384/202 |

FOREIGN PATENT DOCUMENTS

| 1027470 | 4/1958 | Fed. Rep. of Germany | 384/206 |
| 8419027 | 6/1984 | Fed. Rep. of Germany | . |
| 3332323 | 3/1985 | Fed. Rep. of Germany | 384/192 |
| 2201736 | 9/1988 | United Kingdom | 384/192 |

Primary Examiner—Thomas R. Hannon
Attorney, Agent, or Firm—Kenyon & Kenyon

[57] ABSTRACT

The disclosed clamping plate exhibits a particularly great spring action and it includes a clamping rim (10) and with spring tabs (20) which point radially inward and against which the cups of the self-aligning or cup-type bearing make contact. According to the invention the spring tabs (20) are particularly long and extend from the clamping rim (10). The tabs also bend inwardly over a bead (9) limiting the clamping rim (10). An especially inexpensive design from the aspect of production engineering and assembly is achieved in that the transition from the bead (9) to the plug-in hole (2) is rounded in the plug-in direction (6) of the clamping plate and the lower area of the bead (9) is designed as oil collecting groove.

6 Claims, 2 Drawing Sheets

CLAMPING PLATE FOR THE RETENTION OF SELF-ALIGNING FRICTION BEARING

BACKGROUND OF THE INVENTION a. Field of the Invention

The invention relates to a clamping plate for the retention of self-aligning friction bearings, in particular for electric motors, with a larger outside diameter than the seating hole, whose clamping rim and whose spring tabs, pointing radially inward, are offset in the direction opposite to the plug-in direction of the clamping plate into the seating hole.

b. Description of the Prior Art

In a clamping plate described in DE-GM 84 19 027.2 the spring tabs extend from a bottom section in the direction towards the seating hole. On the opposite side, the bottom section leads to the clamping rim. Because the spring tabs are designed as sections of the bottom, their length is relatively short and the spring action accordingly very poor.

OBJECTIVES AND SUMMARY OF THE INVENTION

It is an objective of the invention to increase the spring action of the spring tabs significantly and to be able to use the clamping plate for an oil return, desirable.

The spring tabs of the design according to the invention extend inwardly from the outer clamping plate rim, thus increasing their spring action.

According to one especially preferred embodiment of the invention, the plug-in hole is adapted to the diameter of a self-aligning friction bearing, and the inside diameter of the free, offset ends of the spring tabs is slightly smaller in their relaxed position than that of the plug-in hole.

It is useful for the bead to be cut out on both sides of the bends in the spring tabs. This assures the full spring action down to the roots of the spring tabs.

The lower area of the bead is preferably designed as oil collection groove. The cross-section of this bead is roughly V-shaped.

The transition from the bead to the plug-in hole is preferably rounded in plug-in direction. Also, the offsets at the free edge of the spring tabs may be approximately parallel to the rounding at the plug-in hole and directed towards the latter.

BRIEF DESCRIPTION OF THE DRAWINGS

The drawing illustrates one embodiment of the invention by way of example, wherein.

DETAILED DESCRIPTION OF THE INVENTION

Figure 1:
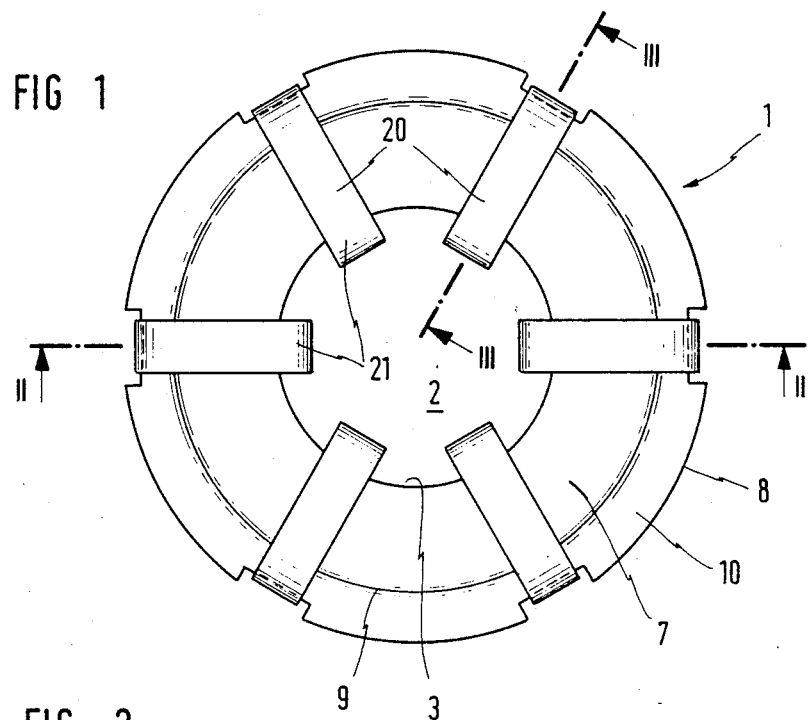
FIG. 1 shows a top view of an embodiment of the invention.

A clamping plate 1 has an inner, round plug-in hole 2 with a free inside edge 3. The plate is provided to hold cup-type friction bearing not shown. The clamping plate 1 is pushed into the seating hole against the cup-type bearing in plug-in direction 6.

The transition zone 7 between the plug-in hole 2 and the free outer edge 8 of the clamping plate 1 is slightly convex and has an annular bead 9 followed in radially outward direction by a clamping edge 10 so that oil expelled centrifugally radially outward from the bearing during operation can be intercepted in the area of the transition zone 7.

Evenly distributed over the circumference of the clamping plate in the embodiment example are six spring tabs 20 which project radially inward. The tabs have the same width and thickness and are terminated in angled ends 21 oriented towards the plug-in hole 2. In the normal position of the clamping plate 1, the diameter of the circle formed by the offset ends 21 is only slightly smaller than the diameter of the plug-in hole 2.

The spring tabs 20 are an integral part of the clamping plate 1. Coming from the transition zone 7, the spring tabs 20 are bent by approximately 180 degrees at the bending point 22, contact the bead 9 and then continue in approximately radial direction towards the center of the plug-in hole 2, as is evident in particular from FIG. 3.

As already mentioned above, the clamping plate is one integral part; it is stamped out of sheet metal, e.g., spring steel; the spring tabs are bent into the position shown by about 180 degrees.

Figure 4:
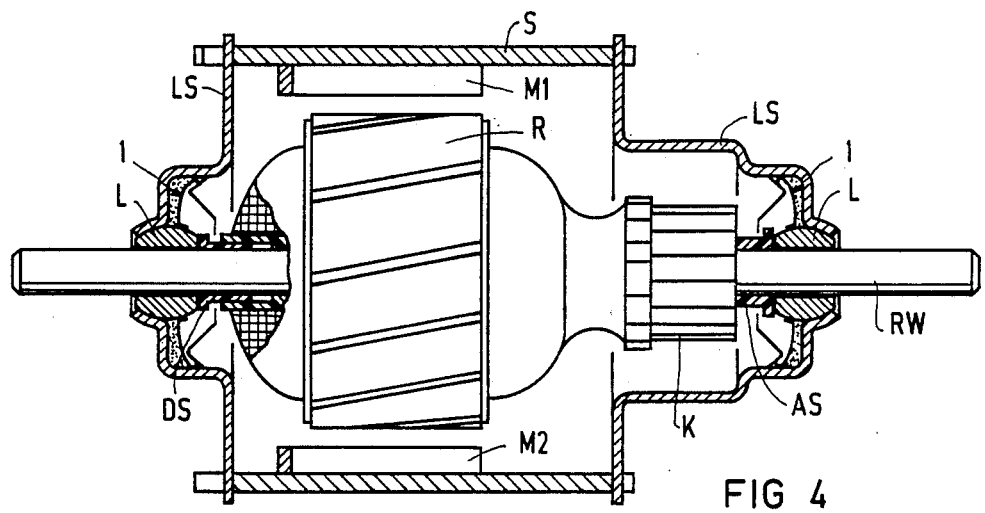
FIG. 4 shows a sectional view of permanently excited commutator motor with clamping plate installed according to the invention.

FIG. 4 shows a permanently excited commutator motor having two clamping plates 1, 1 for bearings L, L. Arranged on the inner surface of a stator housing S are permanent shell magnets M1, M2 for excitation. Fastened at the sides of the stator housing S is a respective support shield LS. Each support shield LS houses a bearing L supported by a corresponding clamping plate for 1. A rotor shaft RW is pivotably supported by the bearings L and holds a laminated rotor R and a commutator K. On the right-hand side of the rotor shaft RW between the bearing L and the commutator K there is a sleeve AS. Similarly on the left-hand side of the rotor shaft RW there is sleeve DS. These sleeves are provided for setting the axial play between the shaft and the housing.

Figure 2:
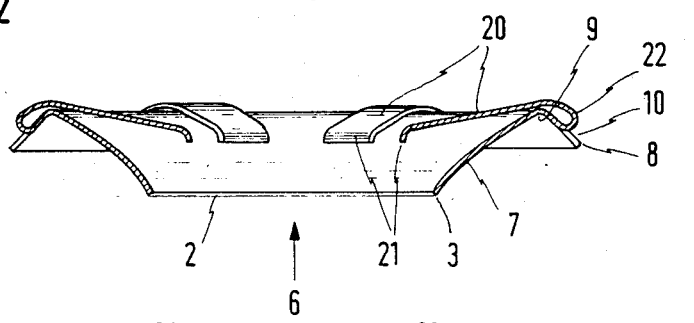
FIG. 2 shows a section along line 2—2 in FIG. 1.
Figure 3:
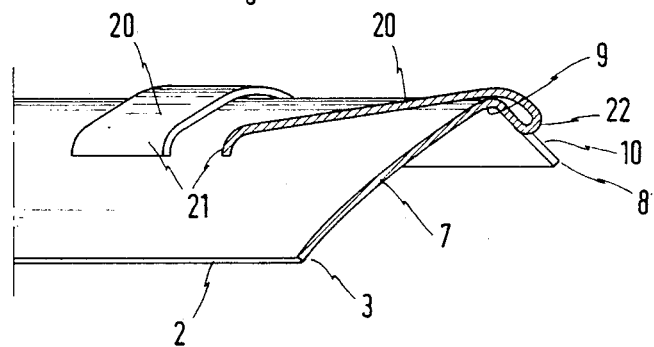
FIG. 3 shows a partial section along line 3—3 in FIG. 1 in a larger scale.
Figure 5:
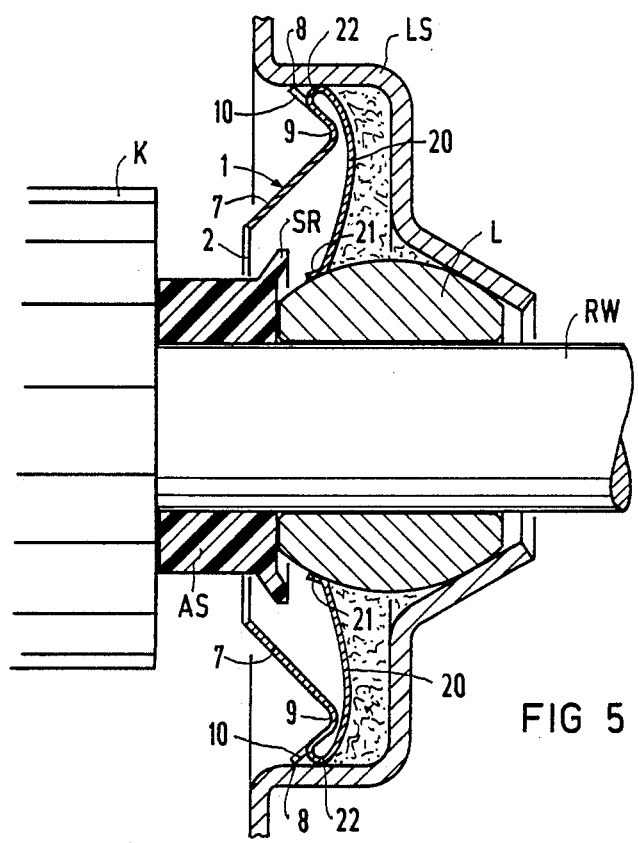
FIG. 5 shows an enlarged view of the motor of FIG. 4.

As can be seen more particularly on FIG. 5, the clamping plate 1 which is described in more detail in FIGS. 1-3, is arranged for supporting the bearing L in the shields LS and for returning the leaking oil slung away by a centrifugal action of disk SR of the sleeve AS. The clamping plate is fixed in its final insertion position by its outer clamping rim 10 disposed in a receiving tubular section of the bearing shield LS extending substantially in the axial direction as shown.

What is claimed is:

1. A clamping plate for retaining self-aligning friction bearings in an electric motor, comprising:
    a circular body with a central seating hole and a clamping rim formed on said body, said circular body having a larger diameter than said seating hole;
    spring tabs connected to said rim and pointing radially inward and being offset in a direction opposite to a predetermined plug-in direction of the body; and
    said clamping rim having a limiting bead over which said spring tabs are inwardly bent.

2. The clamping plate according to claim 1, wherein the central hole is adapted to the diameter of the self-aligning friction bearing and the inside diameter of the spring tabs in their relaxed position is smaller than that of the central hole.

3. The clamping plate according to claim 1 wherein said body includes a transition from said bead to said central hole which transition is rounded in the plug-in direction.

4. The clamping plate according to claim 1 wherein said bead has a lower area to form an oil collecting groove.

5. A clamping plate according to claim 4, wherein said spring tabs have free ends which are approximately parallel to the bead and are oriented towards the central hole, the bead having a rounded transition.

6. A clamping plate for retaining self-aligning friction bearings in an electric motor, comprising:
- a circular body with a central seating hole and a clamping rim formed on said body, said circular body having a larger diameter than said seating hole;
- spring tabs connected to said rim and pointing radially inward and being offset in a direction opposite to a predetermined plug-in direction of the body; and
- said clamping rim having a limiting bead over which said spring tabs are inwardly bent, the limiting bead being cut out on both sides of the bend to turn said spring tabs.

* * * * *